United States Patent [19]

St. Clair et al.

[11] Patent Number: 5,093,453

[45] Date of Patent: Mar. 3, 1992

[54] AROMATIC POLYIMIDES CONTAINING A DIMETHYLSILANE-LINKED DIANHYDRIDE

[75] Inventors: Anne K. St. Clair; Terry L. St. Clair; J. Richard Pratt, all of Poquoson, Va.

[73] Assignee: Administrator of the National Aeronautics and Space Administration, Washington, D.C.

[21] Appl. No.: 449,210

[22] Filed: Dec. 12, 1989

[51] Int. Cl.$^5$ .................. C08G 77/04; C08G 8/02; C08G 69/26
[52] U.S. Cl. ........................ 528/28; 528/21; 528/23; 528/125; 528/126; 528/128; 528/173; 528/176; 528/183; 528/185; 528/188; 528/220; 528/229; 528/351; 528/352; 528/353
[58] Field of Search .............. 528/21, 23, 28, 353, 528/126, 128, 351, 352, 176, 183, 185, 188, 220, 229

[56] References Cited

U.S. PATENT DOCUMENTS 4,603,061 7/1986 St. Clair et al. .................. 264/212

OTHER PUBLICATIONS

Chemical Abstract 92:147385n "Aromatic Polyimides Based Upon Bis(3,4-Dicarboxyphenyl)Dimethyl Silane Dianhydride", Koton, M. M. et al.

Primary Examiner—John Kight, III
Assistant Examiner—P. Hampton-Hightower
Attorney, Agent, or Firm—George F. Helfrich

[57] ABSTRACT

A high-temperature stable, optically transparent, low dielectric aromatic polyimide is prepared by chemically combining equimolar quantities of an aromatic dianhydride reactant and an aromatic diamine reactant, which are selected so that one reactant contains at least one $Si(CH_3)_2$ group in its molecular structure, and the other reactant contains at least one —$CH_3$ group in its molecular structure. The reactants are chemically combined in a solvent medium to form a solution of a high molecular weight polyamic acid, which is then converted to the corresponding polyimide.

7 Claims, 1 Drawing Sheet

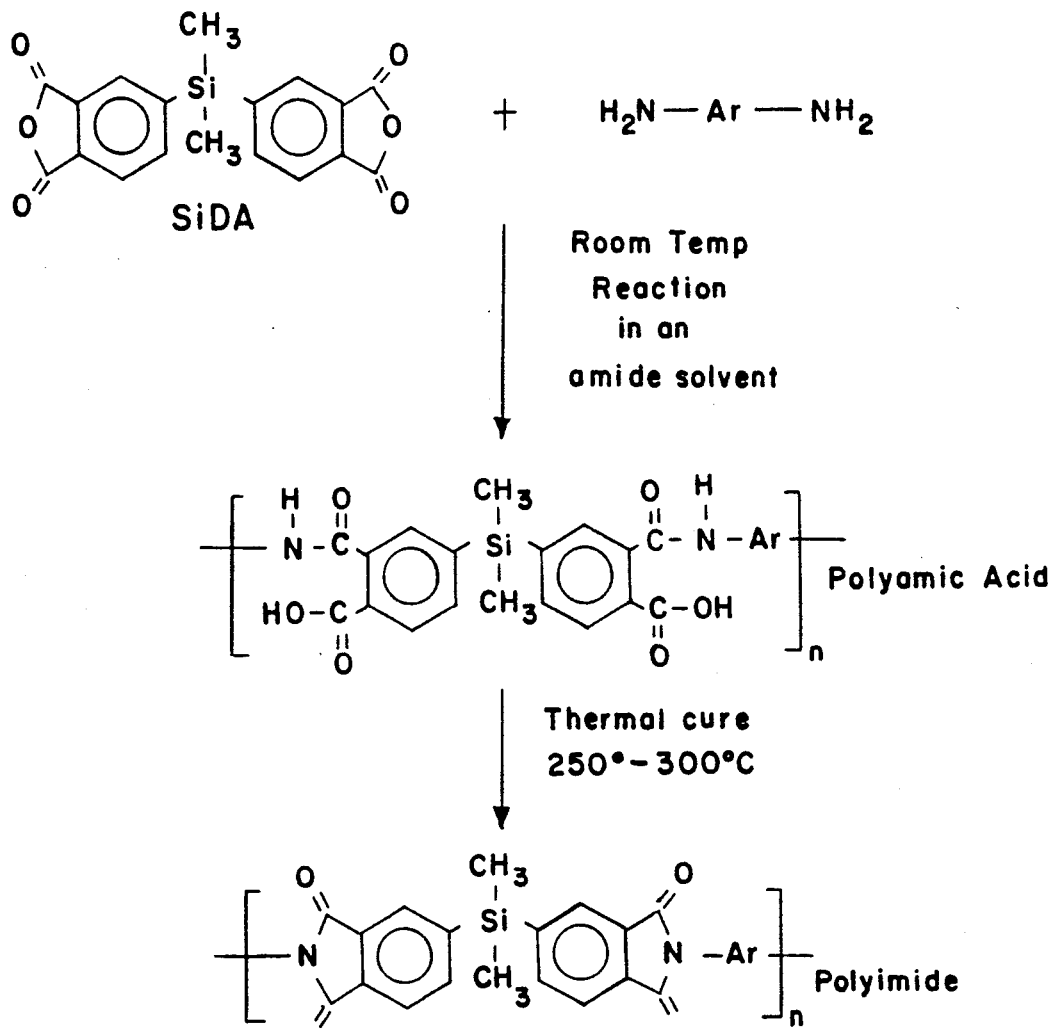

AROMATIC POLYIMIDES CONTAINING A DIMETHYLSILANE-LINKED DIANHYDRIDE

ORIGIN OF THE INVENTION

The invention described herein was jointly made in the performance of work under a NASA Contract and by Government employees and is subject to the provisions of Section 305 of the National Aeronautics and Space Act of 1958, as amended, Public Law 85-568 (72 Stat. 4435; 42 USC 2457).

BACKGROUND OF THE INVENTION

1. Field of the Invention

The present invention relates generally to high-temperature stable polyimides. It relates particularly to aromatic polyimides which contain dimethylsilane in the dianhydride and $-CF_3$ groups in the diamine portion of the polymer chain.

2. Description of the Related Art

Because of their outstanding thermal stability, low density, resistance to radiation, toughness and flexibility, linear aromatic polyimides are being used increasingly for applications in space. Polyimides are also being exploited by the electronics industry as film and coating materials in the production of advanced microelectronic circuitry.

To be useful as a film or coating material for microelectronics applications, a polymer must be an excellent insulator and have a low dielectric constant. The lower the dielectric constant of the candidate polymer, the more efficient the circuit. The dielectric constant of commercially available, state-of-the-art polyimide film presently used for electronics applications ranges from about 3.2 to 4.0 at 10 GHz depending upon moisture content. It is an object of the present invention to provide polyimides which possess dielectric constants in the range of about 2.5 to 2.8 at 10 GHz, which afford a much improved circuit system.

The need exists also for high-temperature, highly optically transparent or colorless film and coating materials for applications on large space components such as solar cells, space mirrors, thermal control coating systems, antennae and many others. Commercial polyimide film is known for its bright yellow color, and it is not efficient in its transmission of solar energy. Accordingly, another object of the present invention is to provide polyimides which are highly optically transparent and therefore are significantly more efficient than currently used materials for these applications.

SUMMARY OF THE INVENTION

By the present invention, the foregoing objects and advantages are attained and the disadvantages of the prior art are obviated by providing novel linear aromatic polyimide films and coatings which contain a dimethylsilane linkage in the dianhydride portion and at least one trifluoromethyl group in the diamine portion of the polymer chain.

BRIEF DESCRIPTION OF THE DRAWING

For a more complete understanding of the present invention, including its objects and attending advantages, reference should be made to the Detailed Description of the Preferred Embodiments, which is set forth below. This detailed description should be read together with the accompanying drawing, wherein the sole FIGURE is a reaction scheme outlining the preparation of polyimides according to the present invention which contain a dimethylsilane linkage in the dianhydride portion and at least one trifluoromethyl group in the diamine portion of the polymer chain.

DESCRIPTION OF THE PREFERRED EMBODIMENTS

Referring now to the reaction scheme set forth in the drawing, polymer grade dimethylsilane-containing dianhydride (SiDA) is combined with an equal molar portion of polymer grade trifluoromethyl-containing aromatic diamine in an amide-type solvent and the mixture is stirred until a high molecular weight polyamic acid is formed. The reaction is carried out at ambient temperature in a closed vessel. The polyamic acid solution is applied to a substrate in the form of a thin film or coating and thermally converted to the polyimide by heating to 250° C.–300° C.

In Table I some properties of the polymers of the present invention are compared with those of a commercial polyimide, DuPont Kapton H ® film. The silicon and fluorine-containing films of the present invention possess significantly lower dielectric constants (2.5–2.8) compared to Kapton ® film. They are also significantly more optically transparent than the commercial film. The polymers of this invention are found to display at least 90% transparency at 500 nm compared to 30% for Kapton ® film measured by UV-visible spectroscopy on 0.50 mil thick film samples.

TABLE I

Properties of SiDA Films

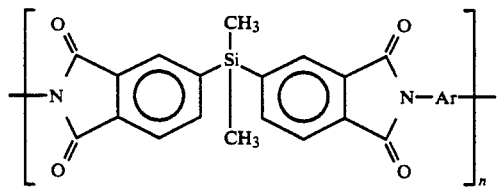

| Polymer | Diamine Ar | Physical Appearance (1 mil thick) | Dielectric Constant at 10 GHz |
|---|---|---|---|
| SiDA + 4,4'-6F | 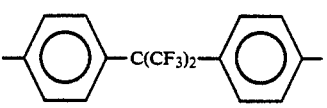 | Essentially Colorless | 2.64 |

TABLE I-continued

Properties of SiDA Films

Structure: [−N(imide)−C₆H₃−Si(CH₃)₂−C₆H₃−(imide)N−Ar−]ₙ

| Polymer | Diamine Ar | Physical Appearance (1 mil thick) | Dielectric Constant at 10 GHz |
| --- | --- | --- | --- |
| SiDA + 4-BDAF | −C₆H₄−O−C₆H₄−C(CF₃)₂−C₆H₄−O−C₆H₄− | Very pale yellow | 2.56 |
| SiDA + 3-BDAF | (3,3'-isomer of above with −O−C₆H₄−C(CF₃)₂−C₆H₄−O− linkage) | Pale yellow/colorless | 2.66 |
| SiDA + DABTF | 3,5-disubstituted phenyl with CF₃ | Pale yellow/colorless | 2.75 |
| Kapton ® | — | Bright yellow | 3.20 |

Although the aromatic dianhydride actually employed contains only one dimethylsilane unit, more than one dimethylsilane unit should produce similar results. Although the aromatic diamines actually employed contain one or two —CF₃ groups, the use of more than two —CF₃ groups should produce similar advantageous results.

Although the polyimides of the present invention were synthesized with a dimethylsilane unit in the dianhydride and —CF₃ groups in the diamine portion of the polymer, similar results should be obtained by locating the dimethylsilane unit in the aromatic diamine and incorporating one or more —CF₃ groups in the dianhydride portion of the polymer.

SPECIFIC EXAMPLES

EXAMPLE I

To a dry vessel was added 1.8146 g (0.0035 m) of polymer grade recrystallized 2,2-bis[4(4-aminophenoxy)phenyl]hexafluoropropane (4-BDAF) (mp 162° C.) and 12.2 g dry dimethylacetamide (DMAc). After the diamine had dissolved, 1.2333 g (0.0035 m) of polymer grade recrystallized bis(3,4-dicarboxyphenyl)dimethylsilane dianhydride (SiDA) (mp 172° C.) was added at once to the stirring diamine/DMAc solution. Stirring was continued for a period of eight hours until all dianhydride had dissolved and a viscous light yellow solution was obtained. The resulting polyamic acid had a solution inherent viscosity of 1.21 dl/g at 35° C. The solution was capped with dry nitrogen and refrigerated until used for film casting.

A film of the SiDA+4-BDAF polyamic acid was prepared by casting the solution (15% solids by weight) onto a soda-lime glass plate in a dust-free chamber at a relative humidity of ten percent. The solution was spread by an aluminum blade with the gap set so as to ensure a final film thickness of 1.0 mil or 0.5 mil. The polyamic acid film was thermally converted to the corresponding polyimide by heating in a forced air oven for one hour each at 100°, 200° and 300° C. The resulting polyimide film was removed from the glass plate after cooling to room temperature by immersion in water. The apparent glass transition temperature of this polymer measured by thermomechanical analysis was 237° C. The dielectric constant of the SiDA+4-BDAF film was found to be 2.56 at 10 GHz.

EXAMPLE II

Using the same method and conditions as described in Example I of the present invention, equimolar amounts of 2,3-bis[4(3-aminophenoxy)phenyl]hexafluoropropane (3-BDAF) (mp 133° C.) and SiDA were dissolved in DMAc to form a polyamic acid having an inherent viscosity of 0.80 dl/g. The resulting polyimide film had an apparent glass transition temperature of 196° C. and a dielectric constant of 2.66 at 10 GHz.

EXAMPLE III

By the same method and conditions described in Example I of the present invention, equimolar amounts of 2,2-bis(4-aminophenyl)hexafluoropropane (4,4'-6F) (mp 194° C.) and SiDA were dissolved in DMAc to form a polyamic acid having an inherent viscosity of 0.63 dl/g. The resulting polyimide film had an apparent glass transition temperature of 300° C. and a dielectric constant of 2.64 at 10 GHz.

EXAMPLE IV

By the same method and conditions described in Example I of the present invention, equimolar amounts of 3,5-diaminobenzotrifluoride (DABTF) (mp 183° C.)

and SiDA were dissolved in DMAc to form a polyamic acid having an inherent viscosity of 0.48 dl/g. The resulting polyimide film had an apparent glass transition temperature of 267° C. and a dielectric constant of 2.75 at 10 GHz.

The foregoing specific Examples are merely exemplary and are not to be considered as exhaustive, but only to illustrate the invention without serving as limitations thereon.

What is claimed as new and desired to be secured by Letters Patent of the United States is:

1. A highly optically transparent and highly insulative aromatic polyimide film prepared from the aromatic polyimide of claim 3 and having a dielectric constant within the range of about 2.5 to 2.8 when measured at 10 GHz.

2. A high-temperature stable, optically transparent, low dielectric aromatic polyimide prepared by chemically combining equimolar quantities of the aromatic dianhydride bis(3,4-dicarboxyphenyl)dimethylsilane dianhydride

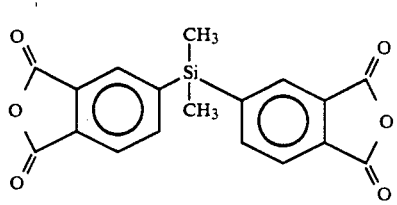

with an aromatic diamine containing at least one —$CF_3$ group in its molecular structure in a solvent medium to form a high molecular weight polyamic acid solution, followed by converting the high molecular weight polyamic acid to the corresponding polyimide.

3. A process for preparing a high-temperature stable, optically transparent, low dielectric aromatic polyimide, which process comprises:

(a) providing bis(3,4-dicarboxyphenyl)dimethylsilane dianhydride

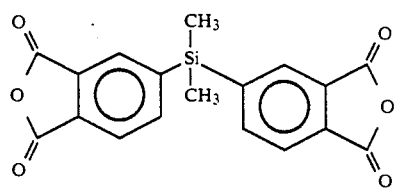

as an aromatic dianhydride reactant, and providing an aromatic diamine reactant which contains at least one —$CF_3$ group in its molecular structure;

(b) chemically combining equimolar quantities of the aromatic dianhydride reactant with the aromatic diamine reactant in a solvent medium to form a high molecular weight polyamic acid solution; and (c) converting the high molecular weight polyamic acid to the corresponding polyimide.

4. The high-temperature stable, optically transparent, low dielectric aromatic polyimide of claim 2, wherein the aromatic diamine is selected from the group consisting of:

2,2-bis[4(4-aminophenoxy)phenyl]hexafluoropropane,
2,2-bis[4(3-aminophenoxy)phenyl]hexafluoropropane,
2,2-bis(4-aminophenyl)hexafluoropropane, and
3,5-diaminobenzotrifluoride.

5. The process of claim 3, wherein the aromatic diamine is selected from the group consisting of:

2,2-bis[4(4-aminophenoxy)phenyl]hexafluoropropane,
2,2-bis[4(3-aminophenoxy)phenyl]hexafluoropropane,
2,2-bis(4-aminophenyl)hexafluoropropane, and
3,5-diaminobenzotrifluoride.

6. The process of claim 3, wherein the solvent medium is selected from the group consisting of:

N,N-dimethylacetamide,
N,N-dimethylformamide,
N-methyl-2-pyrrolidone, and
dimethylsulfoxide.

7. The process of claim 3, wherein the high molecular weight polyamic acid is converted to the corresponding polyimide by thermally treating the high molecular weight polyamic acid in the temperature range of about 250° C. to 300° C. for at least one hour.

* * * * *